United States Patent [19]

Wrigley et al.

[11] Patent Number: 5,525,230

[45] Date of Patent: Jun. 11, 1996

[54] PROCESS OF AND APPARATUS FOR TREATING A FLUID

[75] Inventors: David Wrigley, Cobham; Alan J. Smith, Hemel Hampstead, both of Great Britain

[73] Assignee: Thames Water Utilities Limited, Reading, England

[21] Appl. No.: 182,162

[22] PCT Filed: Jul. 20, 1992

[86] PCT No.: PCT/GB92/01323

§ 371 Date: Mar. 24, 1993

§ 102(e) Date: Mar. 24, 1993

[87] PCT Pub. No.: WO93/02970

PCT Pub. Date: Feb. 18, 1993

[30] Foreign Application Priority Data

Jul. 26, 1991 [GB] United Kingdom ............... 9116172

[51] Int. Cl.⁶ .......................... C02F 3/06; C02F 3/12
[52] U.S. Cl. .................. 210/618; 210/617; 210/903; 210/150; 210/275
[58] Field of Search ................ 210/617, 618, 210/903, 150, 151, 253, 275, 277, 620

[56] References Cited

U.S. PATENT DOCUMENTS

| | | | |
|---|---|---|---|
| 3,680,701 | 8/1972 | Holca | 210/275 |
| 3,829,377 | 8/1974 | Hashimoato | 210/617 |
| 4,183,809 | 1/1980 | Klapwijk et al. | 210/903 |
| 4,465,594 | 8/1984 | Laak | 210/151 |
| 4,892,658 | 1/1990 | Martin et al. | 210/617 |
| 5,006,251 | 4/1991 | Takeishi et al. | 210/618 |
| 5,137,636 | 8/1992 | Bundgaard | 210/903 |
| 5,348,653 | 9/1994 | Rovel | 210/617 |

FOREIGN PATENT DOCUMENTS

| | | |
|---|---|---|
| 2079100 | 11/1971 | France. |
| 4001855 | 7/1991 | Germany. |
| 2195625 | 4/1988 | United Kingdom ........ 210/617 |

*Primary Examiner*—Peter A. Hruskoci
*Assistant Examiner*—Theodore M. Green
*Attorney, Agent, or Firm*—Chilton, Alix & Van Kirk

[57] ABSTRACT

Apparatus (1) for treating a fluid, in this case wastewater, comprising a vessel or tank (2), a conduit (3) to supply the wastewater in an alternating sequence to the vessel (2), and a source (4) for oxygenating the bed of granular media (5) to provide aerated filter media. The filter bed is aerated during operation by air, oxygen enriched air or other gas being introduced at or adjacent the base (as viewed) of the bed through the source (4), which may be a perforated manifold, diffuser or the like extending substantially over the whole surface area of the bed (5). Also, the bed (5) is a granular media such as natural minerals or blast furnace slag media to the surface of the discrete particles of which is attached bacteria and microorganisms (a biomass) which effects treatment of the fluid. The influent at (3) derived from sewage is counter current to the air, and is particularly a non-nitrified influent namely wastewater that has previously been treated to reduce the BOD (biological oxygen demand) and suspended solids concentrations. The blast furnace slag media (5) has an average particle diameter of 2.8–4.0 mm and a porosity of 13.9%. In carrying out the process the periodic reversal of the flow through the filter bed maintains the concentration gradient of the microorganisms (biomass) substantially uniform as a desired concentration of microorganisms throughout the depth of the bed under all operating conditions in the embodiments illustrated. This provides for a uniform, efficient treatment of the sewage.

17 Claims, 3 Drawing Sheets

PROCESS OF AND APPARATUS FOR TREATING A FLUID

The invention relates to a process of and apparatus for treating a fluid, particularly for operating biological aerated flooded filters in the treatment of fluids, particularly domestic and industrial wastewaters, typically for the removal of suspended solids, biochemical oxygen demand, and ammoniacal nitrogen.

Traditionally wastewater treatment is accomplished by biological oxidation of organic and nitrogenous matter by bacteria and micro-organisms under aerobic conditions, suspended in a fluid as in the activated sludge process, or attached to inert support media as in a percolating filter. Although these treatment methods can be effective they require long retention times and the use of final settlement tanks to remove suspended biological solids prior to discharge of the treated effluent.

A proposed water and wastewater treatment apparatus is the biological aerated filter which comprises a bed of granular inert media, with the bacteria and micro-organisms (biomass) responsible for treatment attached to the media surface, in which the fluid to be treated flows constantly down or up through the bed, with the bed maintained in a submerged condition, with air, oxygen enriched air or other gases introduced at or near the base of the bed passing up through the bed to aerate the media and attached biological growth. The large surface area of the media promotes the growth of a high concentration of micro-organisms, giving much smaller aeration tank volumes than conventional treatment options. In addition treatment and solids removal are achieved in a single reactor eliminating the need for final settlement.

The degree of treatment achieved is dependent on the organic nitrogenous and hydraulic media loading rates. Typically the process would be designed on average applied rates with an appropriate "peak to average" constant to accommodate expected flow and load variations thus achieving the required degree of treatment at all times. However, the short retention time within the aerated falter and the plug flow characteristics of the fluid flow through the bed makes the process susceptible to variations in wastewater flow and strength, causing a drop in treatment efficiency and a potentially unacceptable increase in the concentration of pollutants in the effluent.

The need for improvement in river quality standards has also required a greater degree of purification in wastewater treatment processes in order to meet stricter limits on the concentration of, for example, ammoniacal nitrogen in the treated effluent.

In the case where the process is treating a wastewater to remove ammoniacal nitrogen, it having previously received treatment for the removal of the majority of the biochemical oxygen demand and suspended solids, the concentration of autotrophic nitrifying organism attached to the media at any point within the aerated bed will be dependent on the ammoniacal nitrogen substrate concentration and the temperature, providing the dissolved oxygen concentration does not limit growth.

Thus, for a given ammoniacal nitrogen and hydraulic loading rate a substrate concentration gradient will exist through the bed in the direction of wastewater flow and a similar concentration gradient of nitrifying organisms will exist. For example with the wastewater flowing down through the bed a higher concentration of micro-organisms responsible for treatment will exist at the top of the bed, decreasing towards the bottom of the bed as the substrate is removed.

It has been established that the growth rate of nitrifying organisms is slow. If the rate through the bed or the ammoniacal nitrogen loading rate exceeds the maximum nitrification rate, dependent on biomass concentration and time, the nitrifying organisms will not grow at a rate sufficient to cater for the increase in load and effluent quality will deteriorate.

Typically, to overcome this problem, the flow and load of wastewater to the plant must be balanced to equalise out these fluctuations or the depth of filter media is increased. These have the disadvantage of incurring significant extra cost for flow balancing tanks upstream of the treatment plant or on the treatment plant itself. Making the aerated bed deeper would not give any advantage as there would be no significant concentration of micro-organisms in the low sections of the bed.

It is accordingly an object of the invention to seek to mitigate these disadvantages.

According to a first aspect of the invention there is provided a process for treating fluids, comprising providing primary and secondary treatment vessels, each containing a filter bed with attached micro-organisms for treatment of the fluid, and passing liquid and air or oxygen through the beds, characterised by supplying the fluid to be treated to the vessels alternately so that the primary treatment vessel becomes the secondary treatment vessel, and vice versa, and by periodically washing the primary filter bed and aerating the secondary filter bed whereby to provide a substantially uniform desired concentration of micro-organisms throughout the depth of the bed.

Suitably the washing step being a back washing step which provides an efficient regeneration of the filter bed and micro-organisms (biomass).

The media forming the filter bed may be granular. This provides a large surface area of biomass, to provide in turn an efficient treatment.

The filter bed may be at least partially flooded. This provides a suitable environment for the biomass.

The period of time for flow through the respective filter beds may be determined by the growth rate of the micro-organisms. This provides for suitable regeneration of the biomass.

The flow may be in series and periodically reversed in an alternating cycle. This provides a kind of 'flip-flop' operating arrangement which is particularly efficient.

The treatment vessels may alternatively be operated in parallel during periods of high fluid flow such that the fluid to be treated flows to each treatment vessel simultaneously.

Suitably, the fluid may comprise a non nitrified sewage effluent whereby to remove ammonia by nitrification. This provides an efficient ammonia-removing process, particularly where the loading of the primary filter bed may be about 0.6 kg/m$^3$/day and the loading of the secondary filter bed may be about 0.05 kg/m$^3$/day.

In a sewage treatment process the primary filter bed may be backwashed periodically at an interval of days, suitably every three days.

According to a second aspect of the invention there is provided apparatus for carrying out a process as hereinbefore defined, comprising primary and secondary treatment vessels each with a filter bed with attached micro-organisms for treatment of the fluid and means to pass air or oxygen into the filter beds, characterised by means for supplying the fluid to be treated to the vessels alternately so that the primary treatment vessel becomes the secondary treatment vessel, and vice versa, and by means to backwash the primary filter bed.

The filter beds may each comprise a particulate filter media comprising the biomass, for example a blast furnace slag media where the average particle size of the slag media may be 2.8 mm–4.0 mm and the porosity of the media may be about 14%. This provides for efficient filtration and action by the biomass.

Each filter may have a lower outlet for effluent and an upper inlet for effluent. This is a relatively simple yet efficient construction.

The apparatus may include a holding tank upstream of the inlet(s).

According to a third aspect of the invention there is provided a sewage treatment plant, operated by a process as hereinbefore defined or including apparatus as hereinbefore defined.

The invention extends to sewage whenever treated by a process or apparatus as hereinbefore defined.

The granular media forming the filter bed may be aerated or unaerated.

The filter bed may be at least partially flooded, fully flooded, or unflooded.

The fluid to be treated may be supplied to the treatment vessel to flow alternately downwards and upwards, or vice versa, through the filter bed.

Thus using the invention it is possible to provide an apparatus for treating the fluid, comprising a treatment vessel containing an aerated bed of granular media and means to supply the fluid to be treated to that treatment vessel in such a way that the fluid flow can be introduced alternately to the top of the treatment vessel and the base of the treatment vessel, and vice versa, such that the fluid flows up or down through the bed in an alternate pulsed sequence.

Each treatment vessel may comprise a vessel or tank, open or closed to the atmosphere, constructed from natural or synthetic materials, typically concrete, metal or plastic, or any other suitable material.

The duration of the pulse may be set as desired, for example, daily or weekly or some other time period, dependent on the flow and load of wastewater to be treated such that a higher, more constant population of micro-organisms is established throughout the depth of the (aerated) bed.

The change in direction of fluid flow may be carried out after backwashing the media bed within the treatment vessel with treated effluent so that the fluid in the treatment vessel at the end of the wash cycle is fully treated and no untreated or partially treated fluid can be discharged from the treatment vessel when flow of the fluid to be treated is resumed.

Suitably the apparatus for treating the fluid may comprise a number of treatment vessels containing an aerated bed of granular media, typically two in number, with the fluid to be treated flowing upwards or downwards through each aerated bed, one after the other in a line, with the means to supply the fluid to be treated to the inlet of the treatment vessels at each end of the line, and to the other vessels in that line, such that the fluid flow through the line of treatment vessels in normal operation can be periodically reversed in an alternating cycle.

It will be understood that the process and apparatus include suitable devices for controlling the fluid flow, for example, level control devices, valves, pumps or by vacuum.

The period of each fluid flow reversal cycle is thus daily, weekly or some other time period dependent on the pollution load applied to the line of treatment vessels to maintain a higher concentration of micro-organisms throughout the depth of each aerated bed within each treatment vessel.

In normal operation the treatment vessels are operated in series with the fluid flow passing from one treatment vessel to another, as previously described. Where abnormally high fluid flow conditions prevail, for example wastewater flow under storm conditions, an apparatus for operating the treatment vessels such that the fluid passes through all of treatment vessels in parallel rather than in series, is provided. Although a typical wastewater flow under storm conditions has a reduced pollution concentration the increase in flow would lead to a breakthrough of pollutants into the effluent from the aerated bed in each treatment vessel operated in the conventional manner. The high concentration of micro-organisms maintained within each aerated bed by cyclic fluid flow reversal allows the treatment of the higher fluid flows whilst maintaining the required effluent quality.

The granular media may comprise a bed of granules or layers of different granules. The granules may comprise natural minerals, or treated natural or artificial materials, rather than blast furnace slag referred to hereinbefore.

A process and apparatus embodying the invention are hereinafter described, by way of example, with reference to the accompanying drawings.

Figure 1:
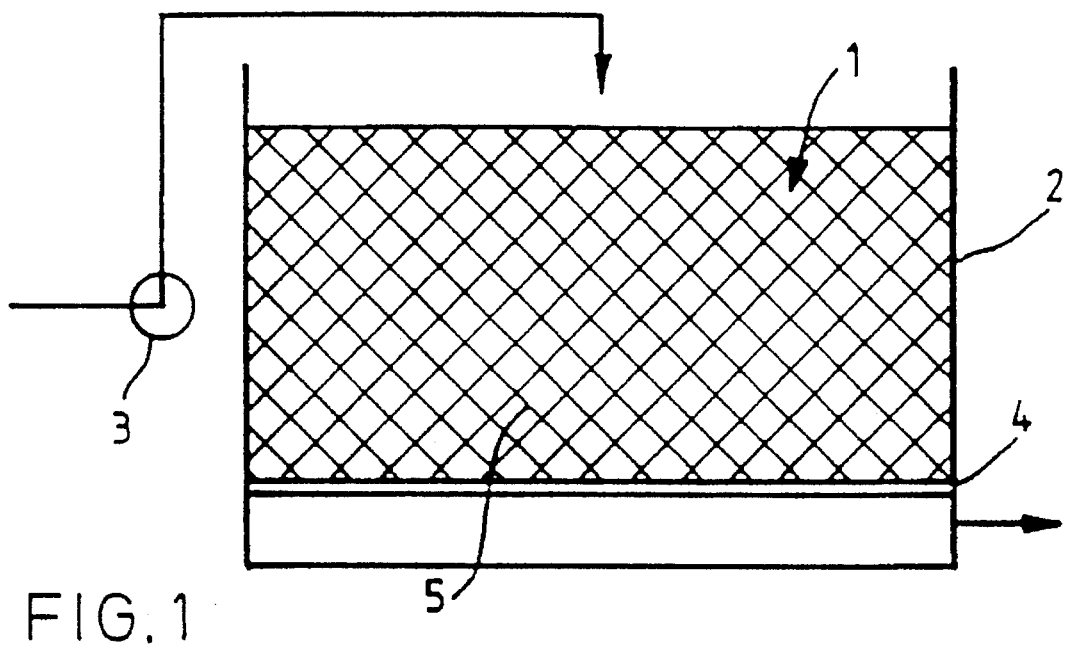
FIGS. 1, 2, 3, 4 and 5 respectively show schematically side elevations of an apparatus for fluid treatment indicating methods of operation according to the invention.

Referring to the drawings, in which like parts are referred to by like numerals, there is provided apparatus 1 for treating a fluid, in this case wastewater, comprising a vessel or tank 2, means 3 to supply the wastewater in an alternating sequence to the vessel 2, and a means 4 for oxygenating the bed of granular media 5 to provide aerated filter media.

Figure 2:
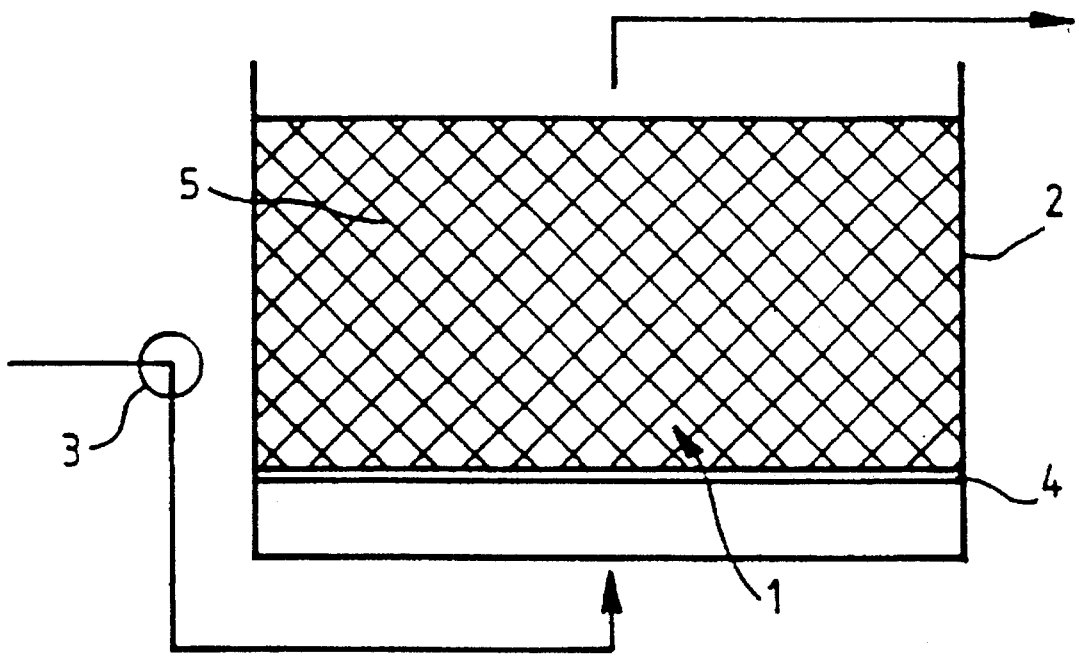
Figure 3:
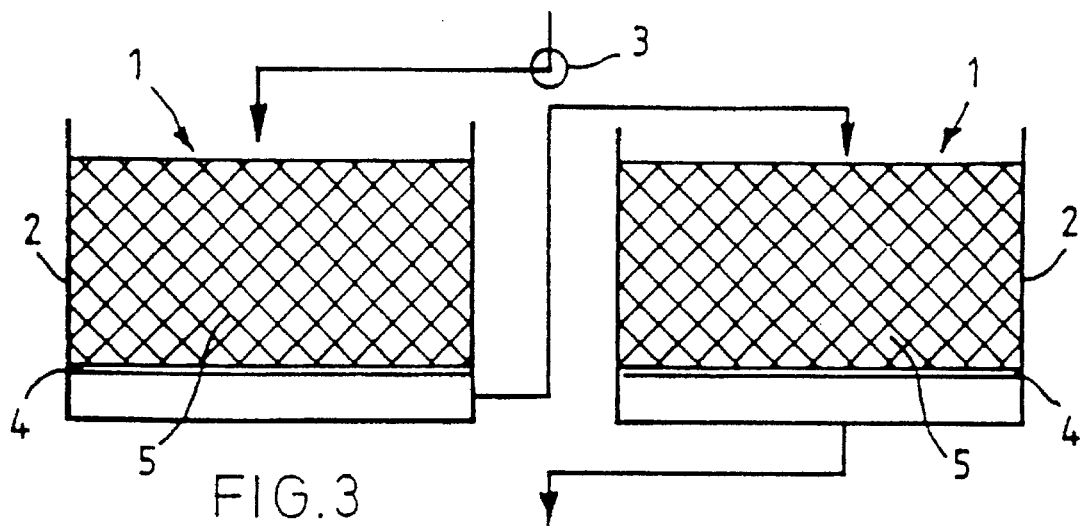
Figure 4:
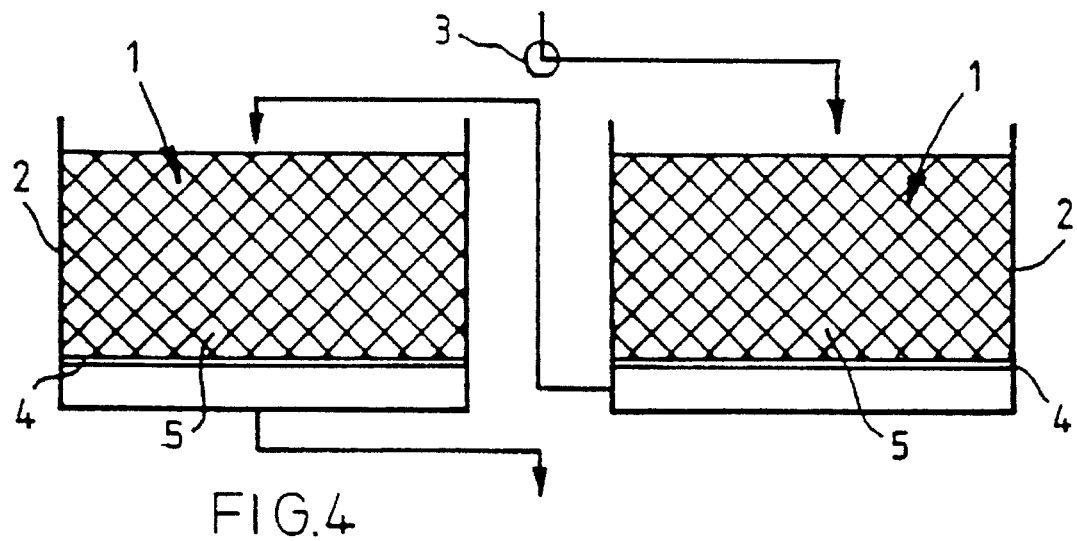
Figure 5:
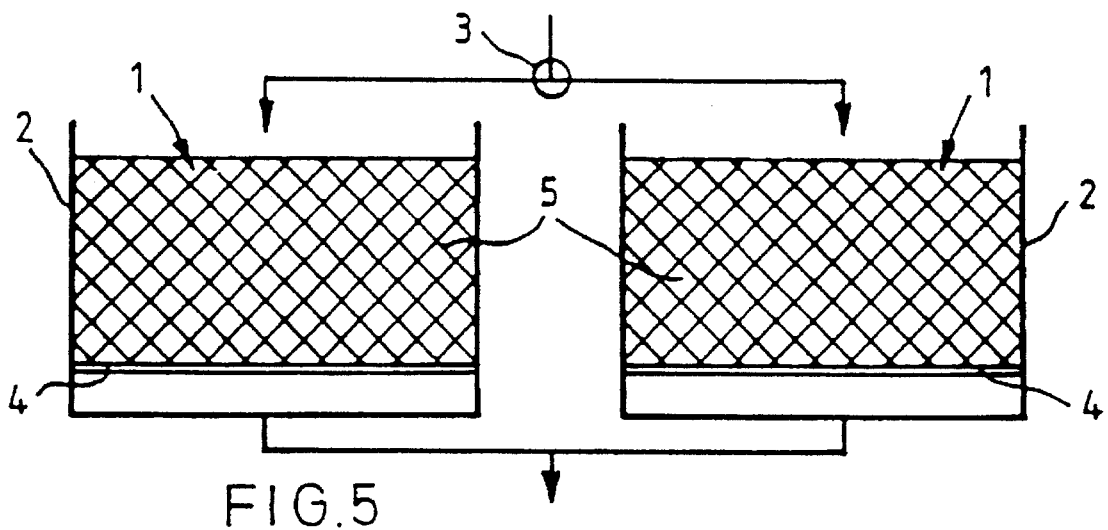

FIGS. 1 and 2 illustate the alternating downward and upward flows respectively of wastewater through the bed of granular media in the treatment vessel;

FIGS. 3 and 4 illustrate the alternating fluid flow through the line of treatment vessels operated in series; and FIG. 5 illustrates the operation of the treatment vessels in parallel under high flow conditions.

In every embodiment, the filter bed is aerated during operation by air, oxygen enriched air or other gas being introduced at or adjacent the base (as viewed) of the bed through the means 4, which may be a perforated manifold, diffuser or the like extending substantially over the whole surface area of the bed 5. Also in every embodiment, the bed 5 is a granular media such as natural minerals or blast furnace slag media to the surface of the discrete particles of which is attached bacteria and micro-organisms (a biomass) which effects treatment of the fluid. The influent at 3 derived from sewage is counter current to the air, oxygen enriched air or like gas, and is particularly a non-nitrified influent namely wastewater that has previously been treated to reduce the BOD (biological oxygen demand) and suspended solids concentrations. The blast furnace slag media 5 has an average particle diameter of 2.8–4.0 mm and a porosity of 13.9%. In carrying out the process the periodic reversal of the flow through the filter bed maintains the concentration gradient of the micro-organisms (biomass) substantially uniform as a desired concentration of micro-organisms throughout the depth of the bed under all operating conditions in the embodiments illustrated. This provides for a uniform, efficient treatment of the sewage.

Figure 6:
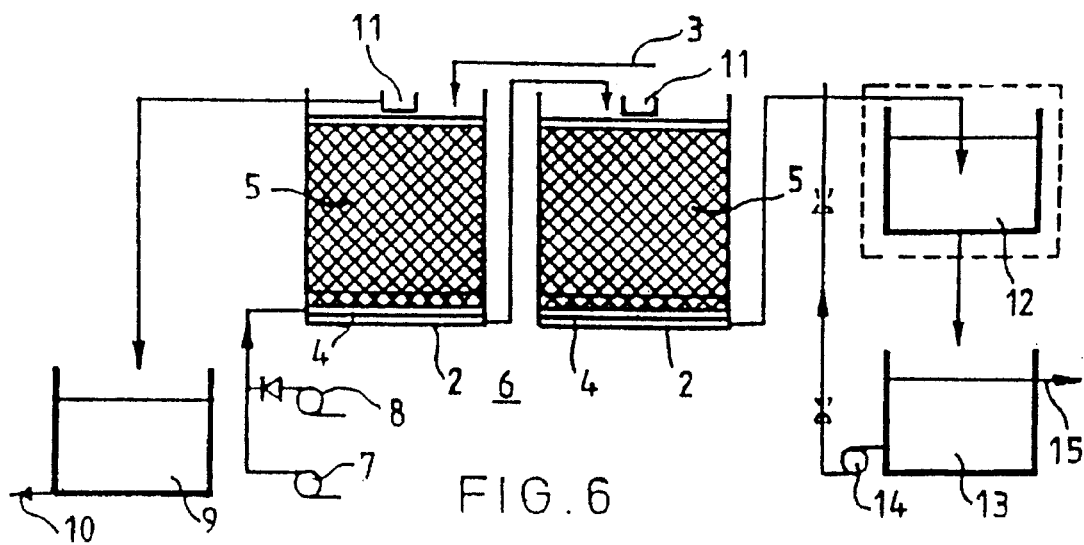
FIG. 6 shows schematically a plant utilising apparatus of FIGS. 3 and 4.

Referring now to FIG. 6, there is shown an arrangement of the two series vessels or tanks 2 of media 5 of FIGS. 3 and 4, in a sewage plant 6 in which the left hand (as viewed) vessel 2 is a primary filter and the right hand (as viewed) vessel 2 is a secondary filter in the mode shown, it being understood that when the flow reverses the right hand vessel becomes the primary filter 2 and the left hand vessel 2 becomes the secondary filter. The manifold, diffuser or the like 4 is connected to an air source comprising a process air blower 7 and air scour blower 8 and there is a dirty backwash tank 9 which delivers dirty backwash water to the inlet 10 of the sewage plant 6.

The non-nitrified feed 3 is of settled sewage, and backwash liquors are provided over the vessels 2 from troughs 11 which also feed the tank 9.

Figure 7:
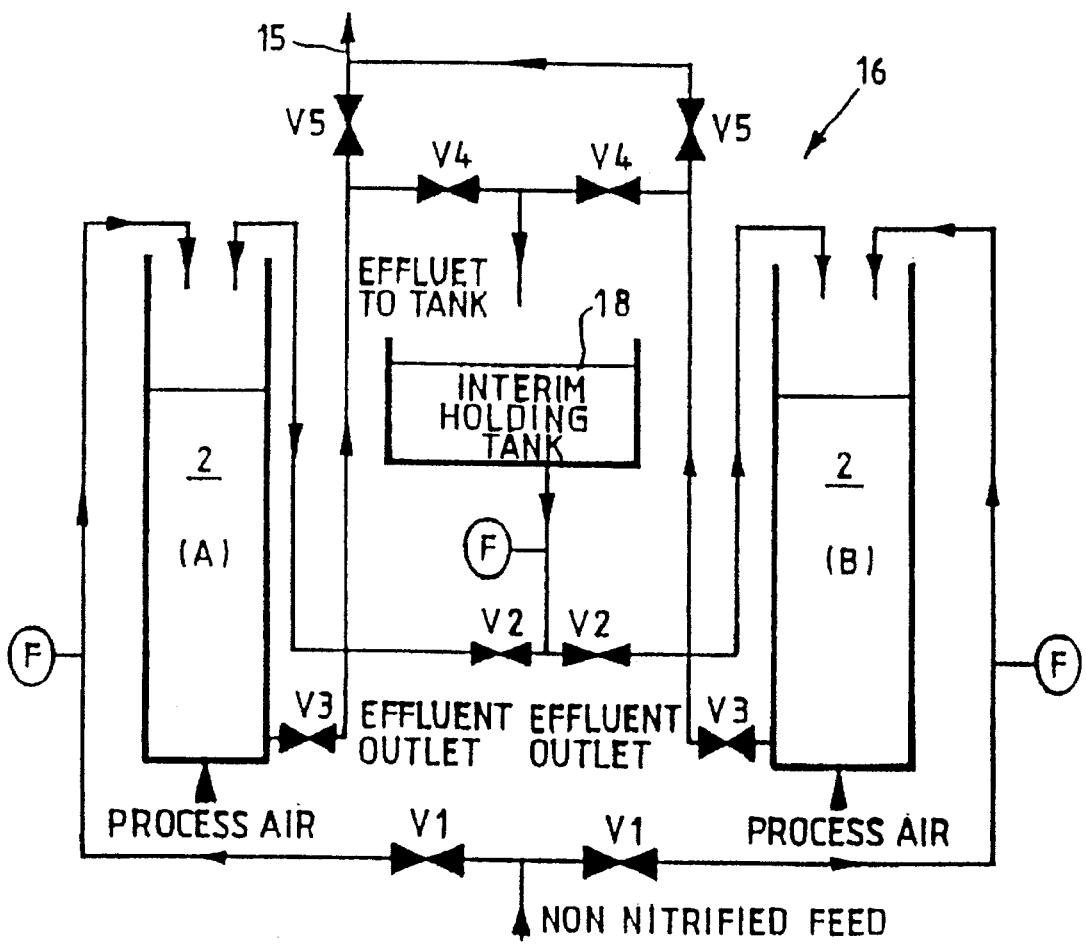
FIG. 7 shows schematically a flow through a plant similar to that shown in FIG. 6.

There is also in series with the vessels 2 a tertiary filter 12 which leads to a washwater reservoir 13 from which a pump 14 delivers wash water to the troughs 11. The final effluent is drawn off from the reservoir at 15. A schematic arrangement of a plant 16 like that of FIG. 6 shown in FIG. 7, in which the valves V1 to V5 are shown as being openable or closable by double headed arrows depending on whether the left hand or right hand vessel 2, identified also as 'A' and 'B' respectively in FIG. 7 is acting as the primary filter at any given time. In this embodiment, there is an interim holding tank 18 for filtered liquid prior to passage to either vessel 2(a) or 2(B) depending on the condition of valve V2.

Average results for a plant embodying the invention are set out in the following table:

| PARAMETER | PRIMARY FILTER | SECONDARY FILTER |
|---|---|---|
| Effluent ammonia mg\l | 1.32 | 0.43 |
| Effluent suspended solids mg\l | 6.41 | 3.44 |
| Effluent BOD mg\l | 8.59 | 3.89 |
| Effluent nitrage mg\l | 6.6 | 7.3 |
| BOD VLR kg\m³\day | 0.9 | 0.26 |
| Ammonia VLR kg\m³\day | 0.6 | 0.05 |
| HLR m³\m²\hour | 2.63 | 2.63 |
| % ammonia removal | 90.6 | 96.9 |
| % BOD removal | 72.3 | 87.2 |
| % solids removal | 68.6 | 76.6 |

NB: Average temperature = 9.2° C.

These results were achieved with an ammonia VLR (volumetric loading rate) of 0.6 kg/m³/day at the primary filter vessel and an ammonia VLR of about 0.05 kg/m³/day at the secondary filter vessel. The table shows that the secondary filter vessel averages an effluent quality of 0.4 mg/l of ammonia and that most of the incoming ammonia is treated in the primary filter vessel which means that the secondary filter has a low ammonia VLR. This means that if there is any "break through" from the primary filter vessel, it can in the process be treated in the secondary filter vessel.

The table also shows that nitrification of the influent is efficient in the process (and plant) embodying the invention, resulting in more than 95% ammonia removal, at an ammonia volumetric loading rate of 0.6 kg/m³/day to the primary filter vessel and 0.05 kg/m³/day to the secondary filter.

Backwashing of the primary filter vessel 2 in the embodiment takes place on average every three days and the direction of flow of influent through the system is reversed at these backwashing times.

In a modification, the primary filter vessel may be washed without changing the flow direction whilst optimally aerating the secondary filter vessel, which would avoid unnecessary valve alterations and aeration costs.

In carrying out the process the periodic reversal of the flow through the filter bed maintains the concentration gradient of the micro-organisms (biomass) substantially uniform as a desired concentration of micro-organisms throughout the depth of the bed under all operating conditions in the embodiments illustrated. This provides for a uniform, efficient treatment of the sewage.

The process therefor provides a very robust treatment of non-nitrified sewage feed for reducing the size, and hence cost of a new sewage plant, or for coping with variable loads applied in a tertiary ammonia removal treatment.

We claim:

1. In a process for treating fluids, including providing primary and secondary treatment vessels, each containing a filter bed with attached micro-organisms for treatment of the fluid, and passing liquid and air or oxygen through the beds, wherein the liquid passes through the bed of the primary vessel in a first direction and through the bed of the secondary vessel in a second direction, the improvement comprising: periodically reversing the direction of flow of fluid to be treated through the vessels whereby the liquid passes through the bed of the primary vessel in reverse direction relative to said first direction and the liquid passes through the bed of the secondary vessel in reverse direction relative to said second direction, such that the primary treatment vessel becomes the secondary treatment vessel and vice versa, and periodically washing the primary filter bed and aerating the secondary filter bed, to provide a substantially uniform desired concentration of micro-organisms throughout the depth of the beds.

2. A process according to claim 1, wherein the washing step is a back-washing step.

3. A process according to claim 2, wherein the media forming each filter bed (5) is granular.

4. A process according to any one of claims 1, 2, or 3, wherein each filter bed (5) is at least partially flooded.

5. A process according to any one of claims 1, 2, or 3, wherein the periods of time for flow through the respective filter beds are determined by the growth rate of the micro-organisms.

6. A process according to any any one of claims 1, 2, or 3, wherein the vessels are in series and are periodically reversed in an alternating cycle.

7. A process according to any one of claims 1, 2, or 3, wherein the treatment vessels are operated in parallel during periods of high fluid flow such that the fluid to be treated flows to each treatment vessel simultaneously.

8. A process according to any one of claims 1, 2 or 3, wherein the fluid comprises a non-nitrified sewage effluent to remove ammonia by nitrification.

9. A process according to claim 8, wherein the loading of the primary filter bed is about 0.6 kg/m³/day and the loading of the secondary filter bed is about 0.05 kg/m³/day.

10. A process according to claim 2, wherein the primary filter bed is backwashed periodically at an interval of days.

11. A process according to claim 10, wherein the periodicity of backwashing is every three days.

12. Apparatus for treating fluids, comprising:

primary and secondary treatment vessels, each with a filter bed with attached micro-organisms for treatment of the fluid, means to pass air or oxygen into the filter beds, means settable in one mode for supplying the fluid to be treated to the vessels such that the fluid passes through the bed of the primary vessel in a first direction and through the bed of the secondary vessel in a second direction, and settable in an alternate mode such that the direction of flow of fluid to be treated through the filter beds can be reversed whereby the fluid passes through the bed of the primary vessel in reverse direction relative to said first direction and through the bed of the secondary vessel in reverse direction relative to said second direction, so that the primary treatment vessel becomes the secondary treatment vessel, and vice versa, and means to backwash the primary filter bed.

13. Apparatus according to claim 12, wherein the filter beds (5) each comprise a particulate filter media carrying the micro-organisms.

14. Apparatus according to claim 13, wherein the filter media comprises blast furnace slag media.

15. Apparatus according to claim 14, wherein the average particle size of the slag media is 2.8 mm–4.00 mm and the porosity of the media is about 14%.

16. Apparatus according to any one of claims 13, 14, or 15, wherein each filter bed (5) has a lower outlet for effluent and an upper inlet for effluent.

17. Apparatus according to claim 16, wherein a holding tank (18) is provided upstream of the inlet(s).

* * * * *